United States Patent
Sun et al.

(10) Patent No.: US 8,554,344 B2
(45) Date of Patent: Oct. 8, 2013

(54) METHOD AND APPARATUS FOR MICROSCOPY

(76) Inventors: Yu Sun, Toronto (CA); Xinyu Liu, Toronto (CA)

( * ) Notice: Subject to any disclaimer, the term of this patent is extended or adjusted under 35 U.S.C. 154(b) by 226 days.

(21) Appl. No.: 12/922,211

(22) PCT Filed: Mar. 13, 2009

(86) PCT No.: PCT/CA2009/000298
§ 371 (c)(1),
(2), (4) Date: Sep. 21, 2010

(87) PCT Pub. No.: WO2009/111877
PCT Pub. Date: Sep. 17, 2009

(65) Prior Publication Data
US 2011/0009983 A1    Jan. 13, 2011

Related U.S. Application Data

(60) Provisional application No. 61/036,247, filed on Mar. 13, 2008.

(51) Int. Cl.
*G05B 19/18* (2006.01)
(52) U.S. Cl.
USPC .................. 700/60; 700/45; 700/69
(58) Field of Classification Search
USPC ................ 700/45, 56, 60, 61, 63, 69
See application file for complete search history.

(56) References Cited

U.S. PATENT DOCUMENTS

| | | | |
|---|---|---|---|
| 4,891,526 | A | 1/1990 | Reeds |
| 5,103,338 | A | 4/1992 | Crowley et al. |
| 5,566,021 | A | 10/1996 | Pettingell et al. |
| 6,777,688 | B2 | 8/2004 | Liu et al. |
| 6,779,278 | B1 | 8/2004 | Spady et al. |
| 6,917,420 | B2 | 7/2005 | Traber |
| 7,630,628 | B2 * | 12/2009 | Ogihara ................ 396/432 |
| 2003/0140691 | A1 * | 7/2003 | Lee ................ 73/162 |
| 2004/0029213 | A1 * | 2/2004 | Callahan et al. ........ 435/40.5 |
| 2005/0199598 | A1 * | 9/2005 | Hunter et al. ......... 219/121.72 |

OTHER PUBLICATIONS

Kassotis et al., "An inexpensive dual-excitation apparatus for fluorescence microscopy", pp. 47-51, Springer-Verlag 1987.*

* cited by examiner

*Primary Examiner* — Carlos Ortiz Rodriguez

(57) ABSTRACT

The present invention relates to a compact motorized rotational stage for microscopy applications and control methods for automated sample orientation/rotation. The rotational stage includes a motor, a rotational motion transmission mechanism, and a rotating sample holder for accommodating a holding device such as glass slides/Petri dishes of different sizes. Mouse embryos are used as an example to explain the control methods. A pattern recognition utility was developed for identifying mouse embryo structures. The transformation between the holding device rotational coordinate frame and the translational positioning stage coordinate frame is calibrated during image-based visual servo control. The polar body of an embryo is oriented through purely image-based visual servo control or through coordinate transformation and closed-loop position control.

9 Claims, 4 Drawing Sheets

METHOD AND APPARATUS FOR MICROSCOPY

CROSS REFERENCE TO RELATED APPLICATIONS

The present application is a national stage application under 35 U.S.C. 371 of International Application No. PCT/CA2009/000298 filed Mar. 13, 2009, which in turn claims the benefit under 35 U.S.C. 119(e) of U.S. Provisional Ser. No. 61/036,247, filed Mar. 13, 2008, the contents of each of which are hereby incorporated by reference into the present disclosure.

FIELD OF INVENTION

The invention relates generally to an apparatus and method for microscopy. More particularly, the invention relates to an apparatus and method that enable the orientation of a sample item for microscopic examination or manipulation while keeping the sample within the field of view of a microscope.

BACKGROUND OF THE INVENTION

Techniques for imaging birefringent objects, such as birefringent molecule imaging (e.g., spindle) in biology and biomedical engineering, require rotational stages operating on inverted microscopes for orienting samples (e.g., biological cells) at a high speed, with a high accuracy, and in an automated manner. Presently, such rotational stages are not commercially available, and there are no known studies/research on this topic in the literature.

Among several model organisms, the mouse is a popular animal widely used in genetic studies and reproductive research. In the injection of mouse embryos and oocytes, the polar body of the embryos must be positioned away from the penetration site to avoid polar body damages and increase the chance of further cellular development. Within the current art for manual associated techniques and technologies, joystick-based and microrobotic mouse embryo injection and embryo orientation is achieved with a holding pipette by repeated vacuum sucking and releasing until the polar body is rotated away from the penetration site. Due to poor controllability, orienting embryos is a slow and trial-error process. Furthermore, the use of a holding pipette makes switching from one embryo to another highly time-consuming. Little or no effort has been spent on speeding up embryo immobilization and orientation control, preventing the realization of full automated, high-speed microrobotic injection.

Embryo orientation may be achieved using a rotational stage mounted on an inverted microscope. In order to observe samples sitting on a rotational stage that is mounted on an inverted microscope, the rotational stage should not introduce any obstruction into the optical path of the inverted microscope. Meanwhile, a sample holder is required to hold the samples on a standard glass slide or Petri dish and importantly, and to keep the sample close enough to the microscope objectives within their working distance. Since the sample is usually not coincident along the rotational axis of the rotational stage, coupled translational motions during rotation cause the target sample to move beyond the field of view. Thus, control methods are needed to keep the sample inside the field of view during sample rotation.

U.S. Pat. Nos. 6,917,420, 6,779,278, 4,891,526, and 6,777,688 are related to rotational stage designs for non-transparent sample imaging. The structures of these stages block the optical path, making them unsuitable for use on inverted microscopes.

U.S. Pat. No. 5,103,338 discloses a rotational stage for positioning objects for microscopic examination. The rotational stage described in this patent does not block the optical path of the microscope. The clamps for holding samples are located on top of the rotating sample holder, which would position a sample outside the small working distances of inverted microscope objectives. The stage is bulky and it is not suited for accommodating and viewing large sample holding devices such as Petri dishes.

The commercial rotational stage offered by Newport Inc. (Irvine, Calif. 92606) which is intended for rotating optical components in optical systems, possesses a through-hole that permit light to pass through. Although such stages do not block the optical path, the clamps for holding samples are located on top of the rotating sample holders, which would position a sample outside the small working distances of inverted microscope objectives. Finally, since stages presented in the above cited prior art were not designed for inverted microscopy use, they cannot be readily mounted on a commonly used motorized XY stage on an inverted microscope.

There arise, however, problems inherent in the use of a rotational stage that is not addressed by the prior art. For example, when the rotational stage rotates through θ° from a fiducial initial rotating position (hereinafter termed a fiducial rotating position), the X- and Y-directional guides also rotate through θ° concomitantly with the stage, which may bring a sample beyond the field of view of the microscope.

In view of the foregoing what is needed is a rotational stage method that overcomes the limitations of the prior art. There is a need for such a rotational stage method that: produces a smooth and fast rotational motion; does not block the light path; possesses a sample clamping mechanism to make the cell sample close enough to the microscope objectives and therefore, within the working distance of the microscope; and has a compact structure to permit the rotational stage to be readily mounted onto a commonly used motorized XY microscopy stage. In addition, control methods for automatic sample orientation control in order to keep the sample inside the field of view while it is rotated by the rotational stage are needed.

SUMMARY OF THE INVENTION

In one aspect, the present invention is an apparatus for use with a microscopic means comprising: a rotational stage capable of holding a plurality of samples, for rotational movement of the plurality of samples about an axis of a field of view of the microscopic means, a base adjacent to the rotational stage, for movement of the rotational stage in an XY horizontal frame, and a position control means to control the motion of the rotational stage and the base.

In another aspect, the microscopic means and the position control means are linked to a host computer, the host computer having control utility and image processing utility.

In one aspect, the present invention is a method a method for orienting a plurality of samples to a desired position within a field of view of a microscopic means comprising: providing an apparatus comprising a rotational stage capable of holding the plurality of samples for rotational movement of the plurality of samples about an axis of a field of view of the microscopic means; a base adjacent to the rotational stage, for movement of the rotational stage in an XY horizontal frame; and a position control means to control the motion of the rotational stage and the base. rotating the rotational stage to orient the plurality of samples to the desired position, and moving the base to keep the plurality of samples within the field of view.

In yet another aspect of the method of the present invention further comprises calibrating the motion of the rotational stage and the motion of the base to orient the plurality of samples to the desired position while keeping the plurality of samples within the field of view of the microscopic means.

In another aspect of the method of the present invention the microscopic means and the position control means are linked to a host computer, said host computer having control utility and image processing utility.

Advantages of the rotational orientation stage of the present invention include the fast orientation of samples of interest while keeping them within the field of view of the microscopic means with smooth rotational motions and without blocking the optical path of the microscopic means, keeping the sample items of interest close to the objectives of the microscopic means and therefore within working distance, and a compact structure to permit the rotational stage to be readily mounted onto a commonly used XY microscope stage.

BRIEF DESCRIPTION OF THE DRAWINGS

A detailed description of the embodiments of the invention is provided herein below by way of example only and with reference to the following drawings, in which.

DETAILED DESCRIPTION OF THE INVENTION

Overview

Figure 1:
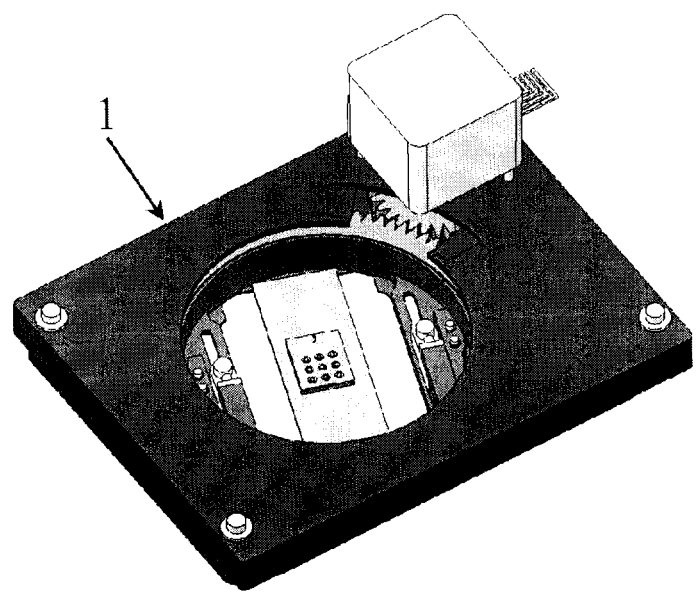
FIG. 1 illustrates a 3D model of the motorized rotational microscopy stage.
Figure 2:
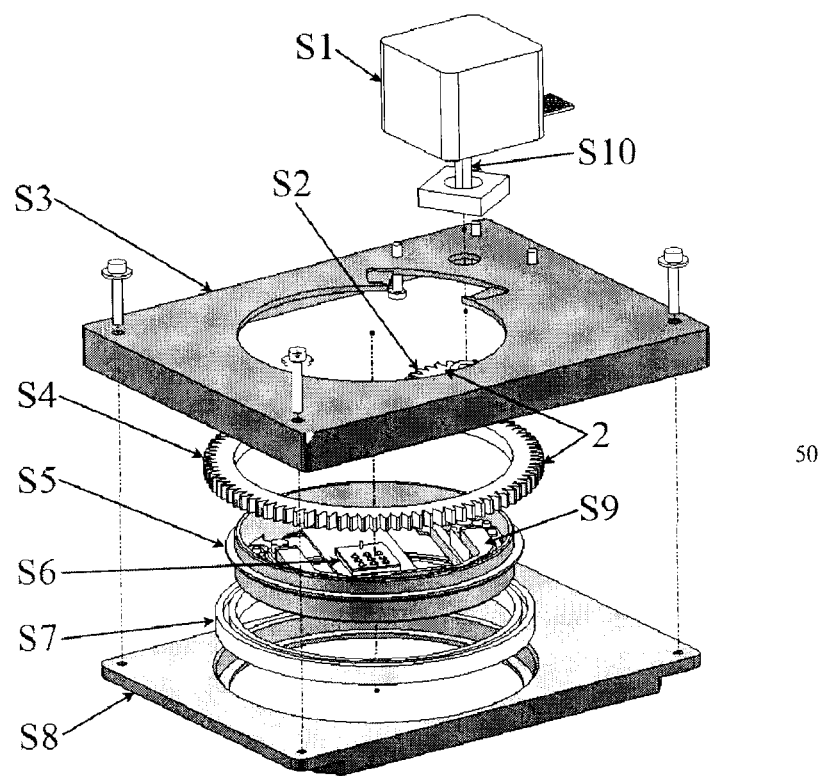
FIG. 2 illustrates an exploded schematic of the motorized rotational stage assembly.
Figure 3:
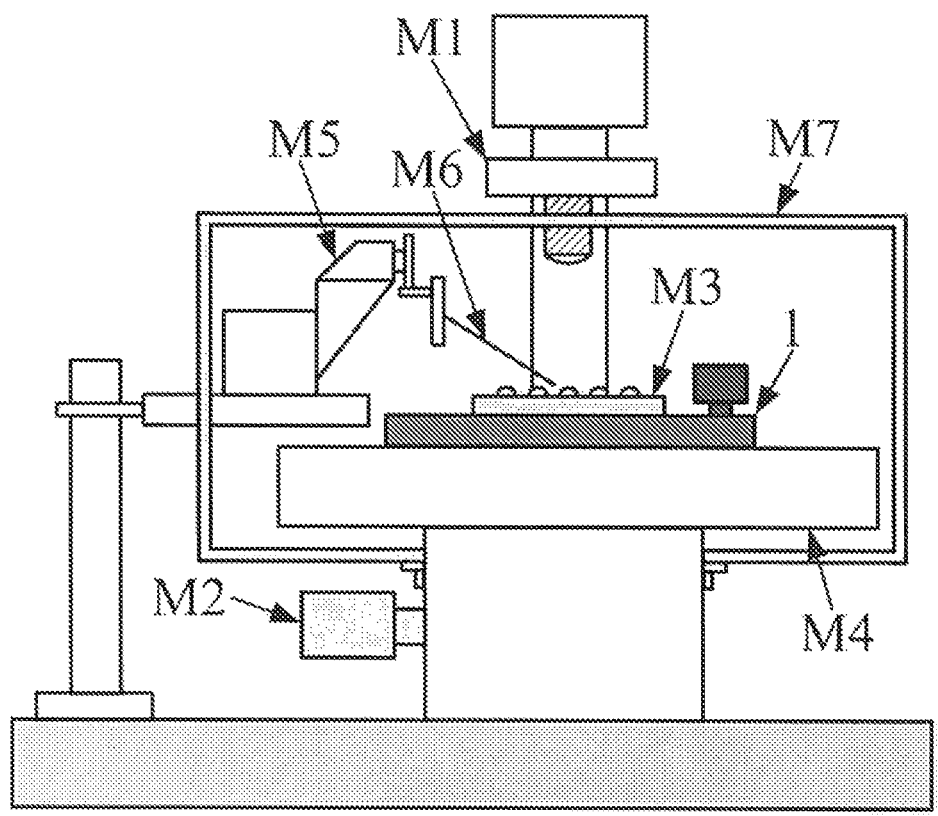
FIG. 3 illustrates a micro-robotic cellular injection system including the rotational stage of the invention.

With reference to FIGS. 1, 2 and 3 the apparatus 1 in accordance to the present invention comprises a base 8 that is adjacent to a rotational stage 50 and control means to control the motion or movement of the rotational stage 50 and the base 8.

The base is operably connected to a microscopic means M1. The microscopic means also has an optical axis passing through the objectives of the microscopic means.

The base 8 may be driven by a motor (not shown) of a conventional type for horizontal movement for bringing a sample within the field of view and vertical movement for focusing the sample. Submicron movements of the stage module may be obtained by microstepping of the motor. The base 8 is designed to permit a readily installation onto a commonly used microscope as a motorized X-Y microscopy stage. The base 8 having means for operably working with the rotational stage.

Figure 9:
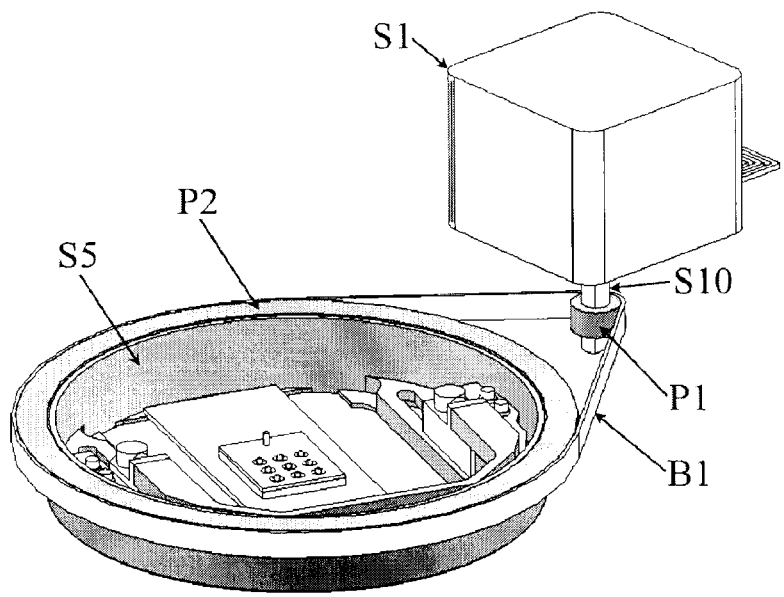
FIG. 9 illustrates an example of a rotational transmission mechanism.

Rotational stage 50, rotates about the optical axis of the microscopic means. In one aspect, the rotational stage 50 comprises a bearing 7, a rotating sample holder 5, clamping means 9 for accommodating a sample container, such as a Petri dish, gears 2 and 4 and a driving means S1. In one aspect the rotational stage 50 is driven by a motor S1 using a transmission mechanism, such as a pair of gears 2 and 4 for transmitting rotational motions. Submicron movements of the rotational stage 50 are obtained by micro stepping the stepper motor. With reference to FIG. 9, an alternative rotational motion transmission mechanism is illustrated consisting of a belt B1 and two pulleys P1, P2. First pulley P1 is attached to the shaft of motor S10 and second pulley P2 is attached to the rotating sample holder S5. Belt B1 connects the two pulleys P1, P2. In another embodiment, the second pulley P2 may be eliminated by directly attaching belt B1 to the rotating sample holder.

In another aspect of the invention, a stage enclosure 3 engages to the base 8 thereby enclosing the rotational stage 5, including the gear pair, and protect the rotational stage 50 internal structure, for example, form dust accumulation.

The stage module 1 of the present invention does not introduce any obstruction into the optical path of the microscope for specimen observation or manipulation. The different parts of the stage module 1 are structured such that the visualization path (optical path in the case of optical microscopes) passes thorough the center of the stage module free of obstructions, other than the sample specimen for observation or manipulation.

Micro-Robotic Mouse Embryo Injection System

In order to demonstrate the operation and control of the rotational stage for cell orientation, mouse embryo is used as a non-limiting application example.

In the injection of mouse embryos and oocytes, the polar body of the embryo must be positioned away from the penetration site to avoid polar body damages and increase the chance of further cellular development. The rotational stage 5 of the present invention can be used to orient the polar body of the embryos and oocytes away from the penetration site. The rotational stage 5 can be integrated into a microrobotic mouse embryo injection system (FIG. 3), which consists of an inverted microscope M1 with a CMOS/CCD camera M2, the rotational stage 1, an in-house developed mouse embryo holding device M3, a motorized X-Y translational base M4, a 3-DOF microrobot M5 for controlling an injection micropipette M6, a host computer with a motion control card, and a temperature-controlled chamber M7 to maintain cells at a desired temperature.

Sample Structure Recognition

Figure 4:
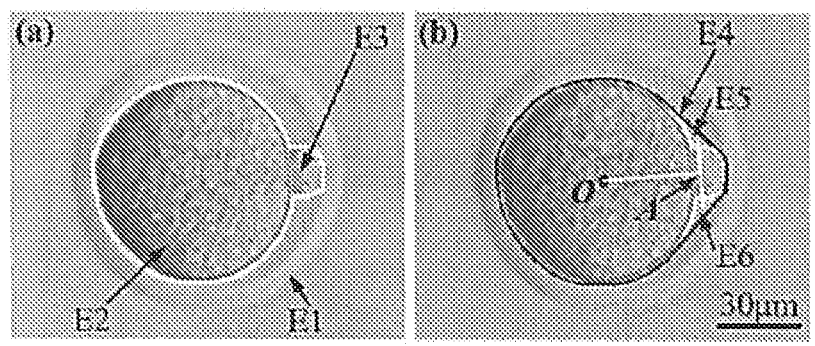
FIG. 4 (a-b) illustrates polar body recognition results.

With reference to FIG. 4(a) a mouse embryo consists of the zona pellucida E1, cytoplasm E2, and polar body E3. To determine the initial orientation of the polar body E3, the polar body E3 is recognized via a pattern recognition utility, which may consist of a patter recognition algorithm implemented to a software utility, that starts with noise suppression using a low-pass Gaussian filter. The de-noised grayscale image is then converted into a binary image using Otsu's adaptive thresholding algorithm. Border edges of the cytoplasm and polar body are connected into a single contour through a morphological close operation, and then identified by finding the contour with the largest area. The resulting image is shown in FIG. 4(a).

In order to distinguish the polar body from the cytoplasm E2, the contour (cytoplasm plus polar body) is converted into its convex hull E4 using the Sklansky algorithm [J. O'Rourke, Computational Geometry in C, 2nd ed., Cambridge University Press, 1998]. FIG. 4(b) label the two convexity defects E5 and E6 that are defined as the area difference between a contour and its convex hull E4. Thus, the orientation of the polar body is determined by the vectorial angle OA, where O is the contour centroid of cytoplasm plus polar body, and A is the midpoint of the centroids of the two convexity defects.

Cell Orientation Control System

Figure 5:
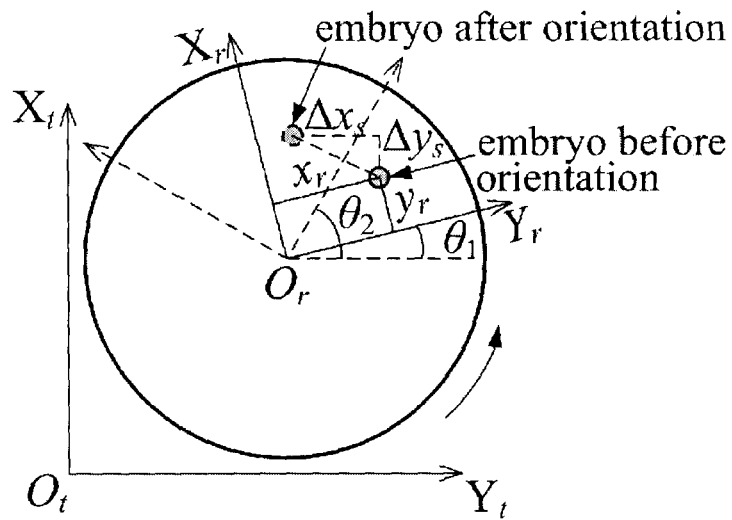
FIG. 5 illustrates the calibration of coordinate transformation.
Figure 6:
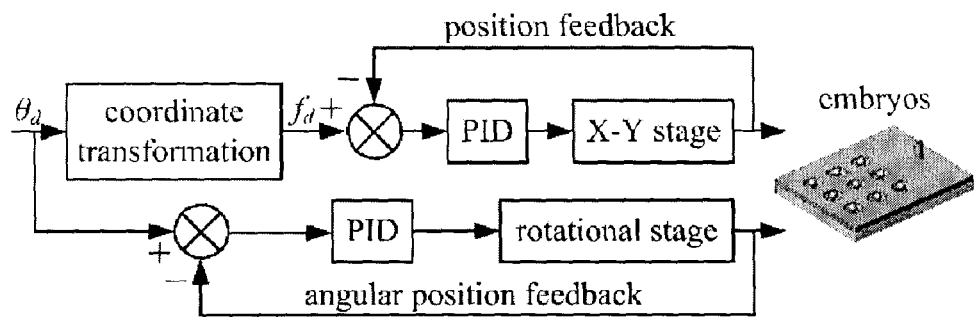
FIG. 6 illustrates a 3-DOF closed-loop control for cell orientation.

Since an embryo is usually not coincident along the rotational axis of the rotational stage, coupled translational motions during rotation cause the target embryo to move beyond the field of view of the microscope (FIG. 5). With reference to FIG. 6, a closed-loop position control system was developed for controlling the X-Y translational stage to bring the embryo back into the field of view, permitting a high cell orientation speed. As shown in FIG. 6, the closed-loop system conducts embryo rotational control and X-Y translational position control simultaneously, representing a 3-DOF close-loop motion control configuration.

In FIG. 6, coordinate transformation between the frames of the rotational stage 5 and the base stage 8 (the X-Y translational stage) is calibrated by image-based visual servoing of the X-Y base for always keeping the embryo inside the field of view during cell orientation. Although the slow dynamic responses of visual servoing due to low vision sampling frequencies (30 Hz) result in a low cell orientation speed, this calibration procedure is only conducted on the first embryo for an entire batch of embryos immobilized on the embryo holding device due to the known pitches between adjacent embryos.

Figure 10:
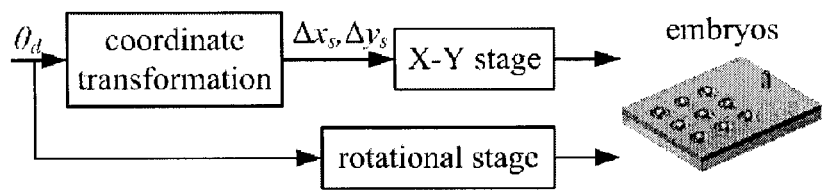
FIG. 10 illustrates a 3-DOF open-loop control for cell orientation.

In another embodiment of the present invention, the position control utility, which may consist of a position control algorithm implemented to a software utility, for controlling the rotational stage and X-Y translational stage is an open-loop in the form illustrated in FIG. 10.

The cell orientation control system selects a portion of the identified polar body including abundant edge information as a tracking target to provide the visual servo controller with position feedback in the image coordinate frame. An SSD (sum-of-squared differences) algorithm with a translation-rotation-scaling (TRS) motion model [7] is employed for tracking the target image patch. The SSD objective function is $$SSD(u) = \sum_{x \in T} [I(f(x, u), t_n) - I(x, t_0)]^2 \quad (1)$$

where $I(x, t0)$ is the intensity of point x in the template image T, $I(f(x, u), tn)$ is the intensity of point x in the rectified image with motion parameters u at time tn, and $f(x, u)$ is the TRS motion model. By minimizing (1), u can be incrementally calculated. The increment $\Delta u$ between two time instants is $$\Delta u = -\Sigma^T (M_0^T M_0)^{-1} M_0^T [I(f(x,u),t_n) - I(x,t_0)] \quad (2)$$

where M0 is an off-line computed constant matrix depending on the template image gradient and the TRS model, and $\Sigma$ is a matrix only determined by the TRS model. With a template of 31×31 pixels used in experiments, real-time visual tracking is achieved (calculation of each $\Delta u$ takes 20.5 ms).

Coordinate Transformation Calibration and Close-Loop Position Control

Prior to the closed-loop translational position control, the transformation of the coordinate frames between the X-Y translational stage and the rotational stage is accurately calibrated. FIG. 5 shows the 2D coordinate frames of the rotational stage (XrOrYr) and the X-Y translational stage (XtOtYt). The transformation from XrOrYr to XtOtYt is obtained by $$\begin{bmatrix} x_t \\ y_t \end{bmatrix} = \begin{bmatrix} \cos\theta & -\sin\theta \\ \sin\theta & \cos\theta \end{bmatrix} \begin{bmatrix} x_r \\ y_r \end{bmatrix} + \begin{bmatrix} x_r^t \\ y_r^t \end{bmatrix} \quad (3)$$

where (xt, yt)T is the target embryo coordinates in the X-Y stage frame, (xr, yr)T is the target embryo coordinates in the rotational stage frame, θ is the angular position of the rotational stage, and (xtr, yrt)T is the coordinates of Or in the X-Y stage frame. In (3), (xr, yr)T and (xtr, yrt)T are the unknowns to be calibrated during image-based visual servoing.

Figure 7:
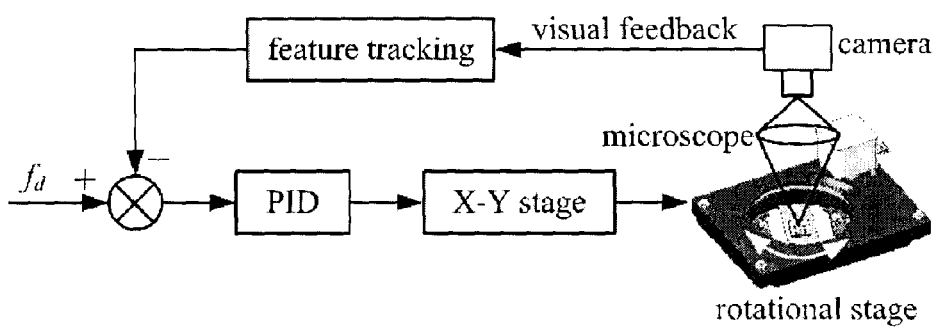
FIG. 7 illustrates an image-based visual servoing of the X-Y translational stage.

With reference to FIG. 7, upon the rotation of the first embryo, an image-based visual servo controller is initiated to control the motorized XY stage for keeping the visually tracked image patch inside the field of view and ultimately, bringing the contour centroid of cytoplasm and polar body (O in FIG. 4(b)) to the image center. The two angular positions before and after orientation, θ1 and θ2, and the corresponding coordinates (Δxrt, Δyrt)T of the X-Y stage are recorded and substituted into (3) to calculate (xr, yr)T.

Figure 8:
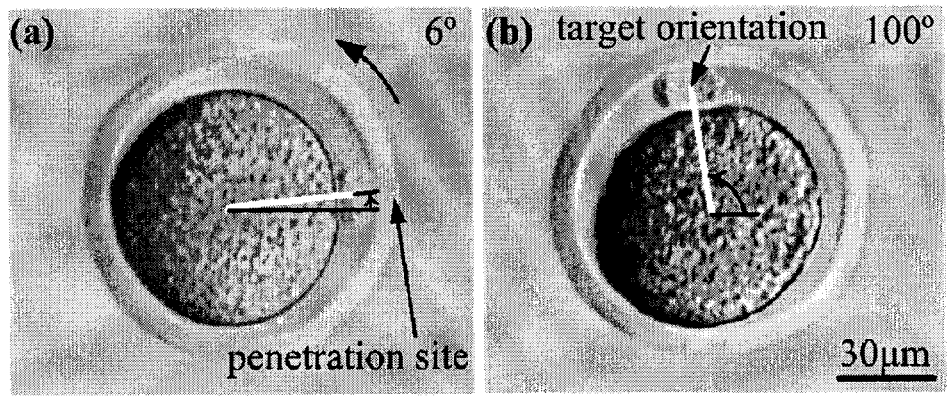
FIG. 8 illustrates experimental results of automated cell orientation.

After the coordinate transformation calibration on the first embryo, other embryos within the same batch are oriented via closed-loop position control shown in FIG. 6. The calibrated coordinate transformation model is used for mapping an orientation angle into translational distances to compensate for rotation-induced translational motions. FIG. 8 shows experimental snapshots of an embryo before and after orientation control.

The present invention is further illustrated by the following example, which is provided by way of illustration and should not be construed as limiting. The contents of all references, published patents and patents cited throughout the present application are also incorporated by reference in their entireties.

Example 1

Materials: Mouse embryos used in the experiment were collected from ICR mice according to standard protocols approved by the Mount Sinai Hospital Animal Care Committee (Toronto). A 20× objective (NA 0.4) and Hoffman modulation contrast imaging were used for embryo observation. Nine embryos at 3 hr post-collection were automatically oriented by the assembly of FIG. 2.

Results: The image-based visual servo controller operates at 30 Hz for orienting the first embryo. Experimental trials demonstrate that the visual servo controller is capable of successfully keeping the target image patch inside the field of view at an orientation speed of 7°/second.

For coordinate transformation calibration, the first target embryo was rotated up to 30°. The complete calibration process took 4.3 sec. The closed-loop position controller is capable of orienting the rest of the embryos within the same batch at 720°/sec (vs. 7°/sec using image-based visual servoing on the first embryo).

The capability of rapidly immobilizing many mouse embryos and automatic, high-speed embryo orientation control will enable high-throughput, fully automated microrobotic mouse oocyte/embryo injection.

What is claimed is:

1. A method for orienting a plurality of samples to a desired orientation within a field of view of a microscopic means, wherein said microscopic means is an optical inverted microscope, said method comprising:

(a) by operation of an apparatus including (i) a rotational stage capable of holding the plurality of samples for rotational movement of the plurality of samples about a visualization path of the microscopic means, (ii) a base adjacent to the rotational stage, for movement of the rotational stage in an XY horizontal frame, and (iii) a position control means to control motion of the rotational stage and the base, rotating the rotational stage to orient the plurality of samples to the desired orientation, wherein the plurality of samples comprise a first subset of samples and a second subset of samples, and simultaneously moving the base for keeping the first subset of samples of the plurality of samples in the visualization path of the microscopic means;

(b) calibrating a transformation of coordinate frames of the rotational stage and the base during rotation of the first subset of samples of step (a);

(c) rotating the rotational stage to orient the second subset of samples to the desired orientation based on the calibrating; and (d) moving the base to bring the second subset of samples to the visualization path based on the calibrating.

2. The method of claim 1, wherein the microscopic means and the position control means are linked to a host computer, said host computer having control utility and image processing utility.

3. The method of claim 1, wherein the calibrating is an image-based visual servoing of the first subset of samples in the plurality of samples.

4. The method of claim 1, wherein the position control means is a closed-loop positioner controller.

5. The method of claim 1, wherein the said position control means is an open loop positioner controller.

6. The method of claim 1, wherein the position control means automatically controls and coordinates motion of the rotational stage and the base.

7. The method of claim 1, wherein the first and the second subset of samples comprise one or more samples.

8. A system for automatically controlling sample orientation with a rotational stage and keeping one or more samples inside a field of view defined by a microscopic means during rotation of the rotational stage, the system comprising:

(a) an optical inverted microscope having an optical path, (b) the rotational stage being capable of holding the one or more samples, for rotational movement of the one or more samples about the field of view defined by the microscopic means, the rotational stage structured such that the optical path of the optical inverted microscope passes through the rotational stage free of obstructions, wherein the one or more samples comprise a first subset of samples and a second subset of samples;

(c) a motorized X-Y translational stage operably connected to the rotational stage for movement of the rotational stage in an XY horizontal frame;

(d) a position control means to control motion of the rotational stage and the base; and (e) a host computer linked to the microscopic means and the position control means, said host computer including (i) a pattern recognition utility product embodied on a non-transitory computer readable medium containing instructions for performing operations, the instructions of the pattern recognition product for visually identifying sample structures; (ii) a computer program calibration product embodied on a non-transitory computer readable medium containing instructions for performing operations, the instructions of the computer program calibration product for calibrating transformation between coordinate frames of the rotational stage and the X-Y translational stage coordinate frame during rotation of the first subset of samples; and (iii) a position control utility product embodied on a non-transitory computer readable medium containing instructions for performing operations, the instructions of the position control utility product for controlling the rotational stage and X-Y translational stage when orienting the second subset of samples based on the calibrating.

9. The system of claim 8, wherein the coordinate transformation between the rotational stage coordinate frame and the X-Y translational stage coordinate frame is calibrated by conducting image-based visual servoing of the motorized X-Y translational stage for keeping a first sample inside the field of view during sample orientation.

* * * * *